US012116978B2

(12) United States Patent
Belenfant et al.

(10) Patent No.: US 12,116,978 B2
(45) Date of Patent: Oct. 15, 2024

(54) METHOD FOR ASSEMBLING A FLOATING OFFSHORE WIND FARM

(71) Applicant: BOURBON OFFSHORE GAIA, Marseilles (FR)

(72) Inventors: Patrick Belenfant, Aix en Provence (FR); Philippe Duquennoy, Saint Maximin la Sainte Baume (FR); Julien Boucard, Marseilles (FR); Christophe Combescure, Marseilles (FR)

(73) Assignee: BOURBON OFFSHORE GAIA, Marseilles (FR)

( * ) Notice: Subject to any disclaimer, the term of this patent is extended or adjusted under 35 U.S.C. 154(b) by 0 days.

(21) Appl. No.: 18/266,139

(22) PCT Filed: Nov. 12, 2021

(86) PCT No.: PCT/FR2021/052003
§ 371 (c)(1),
(2) Date: Jun. 8, 2023

(87) PCT Pub. No.: WO2022/123130
PCT Pub. Date: Jun. 16, 2022

(65) Prior Publication Data
US 2024/0044313 A1 Feb. 8, 2024

(30) Foreign Application Priority Data

Dec. 10, 2020 (FR) ........................................ 2013023

(51) Int. Cl.
*B63B 77/10* (2020.01)
*F03D 13/10* (2016.01)
(Continued)

(52) U.S. Cl.
CPC .......... *F03D 13/126* (2023.08); *F03D 13/112* (2023.08); *F03D 13/2005* (2023.08);
(Continued)

(58) Field of Classification Search
CPC .. F03D 13/126; F03D 13/112; F03D 13/2005; F03D 13/256; F03D 13/25;
(Continued)

(56) References Cited

FOREIGN PATENT DOCUMENTS

| CA | 2851618 A1 * | 4/2013 | ......... E02B 17/0004 |
| WO | 2016/138088 A1 | 9/2016 | |

(Continued)

OTHER PUBLICATIONS

Feb. 23, 2022 International Search Report issued in International Patent Application No. PCT/FR2021/052003.

*Primary Examiner* — Jun S Yoo
(74) *Attorney, Agent, or Firm* — Oliff PLC (57) ABSTRACT

A method for assembling a floating offshore wind farm, including: arranging at least N floating structures on a body of water; providing mast sections for assembling at least N masts; providing turbines and blades for at least N wind turbines; selecting at least one floating structure referred to as the mounting floating structure, the other floating structures being receiving floating structures; fastening a lifting device to the mounting floating structure; moving the mounting floating structure up to a receiving floating structure, and using the lifting device to lift and mount at least one constituent element of a wind turbine on the receiving floating structure; repeating the preceding step for the other receiving floating structures.

25 Claims, 5 Drawing Sheets

(51) Int. Cl.
*F03D 13/20* (2016.01)
*F03D 13/25* (2016.01)

(52) U.S. Cl.
CPC .... *F03D 13/256* (2023.08); *F05B 2230/6102* (2013.01); *F05B 2240/93* (2013.01); *F05B 2240/95* (2013.01)

(58) Field of Classification Search
CPC ............... F03D 13/10; F03D 13/139; F05B 2230/6102; F05B 2240/93; F05B 2240/95; F05B 2230/61; F05B 2240/932; F05B 2240/96; Y02E 10/72; Y02E 10/727
See application file for complete search history.

(56) References Cited

FOREIGN PATENT DOCUMENTS

| WO | 2019/034281 A1 | 2/2019 | |
|---|---|---|---|
| WO | 2019/106283 A1 | 6/2019 | |
| WO | WO-2022098246 A1 * | 5/2022 | ........... B63B 21/502 |

* cited by examiner

METHOD FOR ASSEMBLING A FLOATING OFFSHORE WIND FARM

TECHNICAL FIELD

The invention relates to a method for assembling a floating offshore wind farm, for an assembly in a body of water—generally at sea—of several floating offshore wind power plants.

STATE OF THE ART

Conventionally, a floating offshore wind power plant comprises a wind turbine mounted on a floating structure, such a wind turbine comprising at least one mast fixed to the floating structure and composed of a stack of several mast sections, a turbine fixed to a top of the mast, and blades coupled to the turbine.

The invention finds a preferred, and non-limiting, application for floating offshore wind power plants developing a power of at least 2.5 MW (MegaWatts), or even beyond with powers that can reach 12 MW, 15 MW, 20 MW or more.

In a known manner, the floating structure, also called a float, forms a semi-submersible-type structure, provided with an anchoring system to anchor the floating structure to the seabed. For application to floating offshore wind power plants, various semi-submersible type floating structures are known, such as for example and without limitation:
- a floating structure comprising at least three columns (generally made of concrete and/or steel), each column comprising a non-submerged part and a submerged part, and connecting elements for rigidly connecting the columns to each other, as known from documents FR3093699, FR3093074, EP3342699, EP3546337, WO2019/034281 and WO2015120227; or
- an annular floating structure, generally made of concrete and/or steel, for example of rectangular, square or triangular shape, as known from documents EP1106825, WO2019/106283 and EP2668090.

For the mounting of a floating offshore wind power plant, the practice is to move the floating structure up to a quay on which a crane is provided with a suitable height and lifting capacity to be able to lift the mast sections in order to stack them on the floating structure, then lift the turbine to fix it to the top of the mast and finally lift the blades to couple them to the turbine, as for example known from document WO2016/138088. These operations must be repeated to each floating offshore wind power plant, generally with a unique crane, sometimes specially designed to meet such challenges in terms of lifting capacity and height. For example, the height of the mast can exceed 100 meters and can reach 120 meters for a power of 12 MW, or even 160 meters for a power of 20 MW, the mast sections can weigh from 30 to 200 tons, a turbine can weigh from 400 to 650 tons or even more, and each blade can weigh from 20 to 60 tons or even more.

In this context, when it comes to mount several floating offshore wind power plants, the availability of the quay, and in particular the available length of the quay, the depth at the quay level, and the structural capacity of the quay to support a quayside lifting crane of sufficient capacity for the loads to be lifted, becomes a logistical and geographical constraint which determines the installation and assembly schedule of floating offshore wind power plants, and consequently the electricity production schedule and the cost of start of production.

Moreover, to meet the increased requirements in terms of height and weight, direct consequences of the increase in power, it often becomes mandatory to have recourse to a preliminary construction of a dedicated crane, or even to the construction of a dedicated quay or to an adaptation (reinforcement, lengthening) of an existing quay due to the capacity of the crane and its proximity to the quay, thus increasing both the time and the costs to assemble the floating offshore wind power plants.

SUMMARY OF INVENTION

The present invention aims to solve all or part of the aforementioned problems, by proposing a method for assembling a floating offshore wind farm which makes it possible to be less dependent on the constraints of the quay, with a reduced cost compared to the use of a quayside crane, regardless of the power of the floating offshore wind power plants (therefore regardless of the height and weight of the constituent elements of the wind turbine).

Another object of the invention is to reduce the assembly time and thus allow faster production of the floating offshore wind farm.

To this end, the invention proposes a method for assembling a floating offshore wind farm, for an assembly in a body of water of at least N floating offshore wind power plants, N being an integer greater than or equal to 3, wherein each floating offshore wind power plant comprises at least one wind turbine mounted on a floating structure, such a wind turbine comprising an assembly of several constituent elements including at least one mast fixed to the floating structure and composed of a stack of several mast sections, a turbine fixed to a top of the mast, and blades coupled to the turbine, this method for assembling a floating offshore wind farm comprising the following steps of:
- providing and placing at least N floating structures on the body of water;
- providing a plurality of mast sections for assembling at least N masts;
- providing turbines and blades for at least N wind turbines; this method for assembling a floating offshore wind farm being remarkable in that it comprises the following steps of:
- selecting, among the at least N floating structures, at least one floating structure called floating mounting structure, the other floating structures being called receiving floating structures;
- fastening a lifting device to the floating mounting structure;
- moving the floating mounting structure up to one of the receiving floating structures, and using the lifting device to lift and mount at least one of the constituent elements of the wind turbine onto said receiving floating structure;
- repeating the preceding step for the other receiving floating structures.

Thus, the invention proposes to use one of the floating structures of the series as a support for a lifting device, which will allow the floating mounting structure to lift in harbor or at sea all or part of the constituent elements of the turbine, such as the blades and possibly the mast sections and the turbine depending on the capacity of the lifting device present on the floating mounting structure.

From an economic point of view, this solution is particularly interesting because it is based on a floating mounting structure which is extracted from a series of several floating structures manufactured on a large scale (depending on the size of the wind field), thus contributing at an economy of scale and thus at a reduced manufacturing cost of the floating mounting structure (cost diluted in the manufacturing cost of the at least N floating structures).

From a logistical point of view, this solution is just as interesting because it makes it possible to depend less, or even not to depend, on a quay to assemble the wind turbines on the receiving floating structures.

Of course, within the meaning of the invention, it is possible to provide two or more floating mounting structures with lifting device, to accelerate the mounting of the wind turbines.

It is also possible, within the meaning of the invention, for each floating offshore wind power plant to comprise one or more wind turbines on its floating structure, in other words the floating structure supports one or more wind turbines. Also, in the context of the invention, once the floating mounting structure is coupled to a receiving floating structure, the lifting device can be used to mount at least one of the constituent elements of a wind turbine, or even of two or more wind turbines, depending on the number of wind turbines to be mounted on this receiving floating structure.

Finally, the method according to the invention makes it possible to erect wind turbines in a place other than a port, in particular in a sheltered bay, a marine golf course such as a ria or a stranding area or body of water generally at sea, closer to the location of the production site, thus reducing transit times between the place of assembly and the production place, which also reduces the weather risk and the overall economics of the project.

In a first embodiment, the method comprises the fastening of a mast on the floating mounting structure, by stacking several mast sections among the plurality of mast sections, and wherein the lifting device is fixed on the top of the mast provided on the floating mounting structure.

Thus, the lifting device is fixed on a mast which has been assembled by a stacking of several mast sections, which makes it possible to raise the lifting device high enough by using a wind turbine mast, with the advantage of making an economy of scale by using a mast produced on a large scale for the farm, and thus reduce the manufacturing cost.

In a second embodiment, the lifting device comprises a lifting structure having a sufficient height to lift and mount all of the constituent elements of the wind turbine onto the receiving floating structure.

Thus, the floating mounting structure is equipped with a lifting device making it possible to lift the various elements such as turbine, mast, and blades.

In the first embodiment, and also in the second embodiment, the mast and/or the lifting device can be mounted on the floating mounting structure by a «small» quayside crane of smaller size than a «big» crane conventionally designed to install a turbine on the quay. The economic interest is therefore to do away with a «big» quay crane allowing heavy loads to be lifted at great height. Moreover, the weight and descent of the load of the «small» crane being lower, the quay and its rear quay will need fewer reinforcements.

In an advantageous embodiment, once the floating mounting structure has moved up to the receiving floating structure, at least one lower spacing device is interposed between the receiving floating structure and the floating mounting structure to maintain a minimum spacing.

It should be noted that, within the meaning of the invention, the closeness movement between the floating mounting structure and the receiving floating structure can be done by moving one and/or the other of these two floating structures, for example by means of a tugboat. The purpose of the lower spacing device(s) is to maintain the minimum spacing between these two floating structures and advantageously to limit the relative displacements between these two floating structures.

Advantageously, the or each lower spacing device has a degree of freedom in translation in a vertical direction, in order to allow vertical relative displacement between the two floating structures.

According to one possibility, the at least one lower spacing device is fixed beforehand on the floating mounting structure and is fixed on the receiving floating structure following the closeness movement of the floating mounting structure, thus making it possible to use the same lower spacing device(s) for various receiving floating structures.

In this way, the or each lower spacing device is fixed both to the floating mounting structure and to the receiving floating structure, which makes it possible to maintain these two floating structures together and thus lock degrees of freedom between the two floating structures to facilitate the mounting on the receiving floating structure of the element (s) of the wind turbine from the floating mounting structure.

The height and the angular sector of the lower spacing device(s) also make it possible to take up the relative forces between the two floating structures after mooring for wind and sea conditions, in the harbor or in the bay.

It is advantageous to have at least two, or even at least three, lower spacing devices between the two floating structures.

According to a possibility adapted to the first embodiment, at least one upper spacing device is fixed on the mast provided on the floating mounting structure, and is fixed on a mast erected on the receiving floating structure following the closeness movement of the floating mounting structure and the erection of such a mast on the receiving floating structure, thus making it possible to limit the relative displacements between these two masts.

According to a possibility adapted to the second embodiment, at least one upper spacing device is fixed to the lifting structure of the lifting device provided on the floating mounting structure, and is fixed to a mast erected on the receiving floating structure following the closeness movement of the floating mounting structure and the erection of such a mast on the receiving floating structure.

In this way, the or each upper spacing device is fixed both to the mast or the lifting structure provided on the floating mounting structure and to the mast of the receiving floating structure, which makes it possible to maintain solidarity and therefore parallel these two masts or the lifting structure and the mast.

Advantageously, the or each upper spacing device has a degree of freedom in translation in a vertical direction, in order to allow relative vertical movement between the two masts.

Even advantageously, the at least one lower spacing device is equipped with at least one damper. Similarly, it is conceivable that the at least one upper spacing device is equipped with at least one damper.

The damper can be a contact damper, in an elastically compressible material (for example rubber or equivalent) or according to an adjustable compressible structure (for example a compressible spring or a damping piston).

According to one feature, a ballasting system is provided on the floating mounting structure to adjust a height of the lifting device when it is used to lift and mount at least one of the constituent elements of the wind turbine onto the receiving floating structure.

The floating mounting structure may thus have a controlled draft, for example in the range of 2 meters under the floating mounting structure, and the latter may use its own ballasting system to compensate for the tidal range or height of the tide (difference in level between high tide and low tide of a tide) and also the effects of load transfers during lifting if necessary.

It may in particular be advantageous to ballast the floating mounting structure for heavy lifting, that is to say beyond a predefined threshold, so as not to have parasitic forces in the lower spacing device(s).

According to a first embodiment, the lifting device is used to lift and mount the blades of the wind turbine up to the turbine onto the receiving floating structure, after having previously mounted the mast and the turbine onto said receiving floating structure.

In other words, it is possible to use the lifting device of the floating mounting structure to lift the blades up to the turbine mounted at the top of the mast provided on the receiving floating structure; it being noted that the mast and/or the turbine may have been mounted by means of this same lifting device, or by another means (such as by means of a crane on the quay).

According to a second embodiment, the lifting device is used to lift and mount the mast of the wind turbine onto the receiving floating structure, by gradually lifting and mounting the corresponding mast sections by means of the lifting device.

In other words, it is possible to use the lifting device of the floating mounting structure to lift the mast sections and thus assemble a mast on the receiving floating structure; it being noted that the turbine and/or the blades can be mounted subsequently by means of this same lifting device, or by another means (such as for example by means of a crane on the quay).

According to a third embodiment, the lifting device is used to lift and mount the turbine onto the receiving floating structure, after having previously mounted the mast onto said receiving floating structure.

In other words, it is possible to use the lifting device of the floating mounting structure to lift the turbine to the top of the mast provided on the receiving floating structure; it being noted that the mast may have been erected using this same lifting device, or by another means (such as for example by means of a crane on the quay) and/or that the blades can be mounted subsequently by means of this same lifting device, or by another means (such as for example using a crane on the quay).

According to one possibility, at least one of the constituent elements of the wind turbine, intended to be lifted and mounted on the receiving floating structure by means of the lifting device, is stored beforehand on a storage arrangement provided on the floating mounting structure.

Thus, the floating mounting structure supports a storage arrangement which will make it possible to store all or part of the constituent elements of the wind turbine on it for the receiving floating structure, thus avoiding multiple round trips to the land storage area.

In a first possible embodiment, the floating mounting structure is brought beforehand to an edge of a quay or a storage barge in order to load onto the storage arrangement at least one of the constituent elements of the wind turbine, intended to be lifted and mounted on the receiving floating structure by means of the lifting device.

In a second possible embodiment, alternatively of the aforementioned first embodiment, the floating mounting structure is docked by a boat or a barge transporting at least one of the constituent elements of the wind turbine, intended to be lifted and mounted on the receiving floating structure by means of the lifting device, in order to load it onto the storage arrangement.

Advantageously, in the first embodiment, the constituent element(s) of the wind turbine, which is or are lifted and mounted on the receiving floating structure by means of the lifting device, is or are guided along the mast provided on the floating mounting structure during lifting, by means of a guide rail fixed to said mast.

Such a guide rail is advantageous for vertically guiding the lifting and stabilizing the constituent element(s) of the wind turbine.

According to one possibility, the lifting device comprises a lifting system driving up/down a lifting cable carried by a jib and coupled to a hooking element, so that the constituent element(s) of the wind turbine, which is or are lifted and mounted on the receiving floating structure by means of the lifting device, is or are hooked to said hooking element before being mounted.

The lifting system can be a lifting winch, for example electric or electrohydraulic and/or with local or remote control. This lifting system can be coupled to the lifting cable for single strand lifting, or it can be coupled to the lifting cable via a reeving system for multi-strand lifting, depending on the load to be lifted. The jib also makes it possible to lift a load above the top of the mast or the lifting structure, which is practical for the turbine.

Advantageously, this jib is orientable, that is to say movable in rotation around a vertical axis of rotation, and can optionally be raised/lowered, that is to say be movable in rotation around a horizontal axis of rotation.

According to a variant, the lifting system is coupled to an orientation ring allowing a rotation of the lifting device around a vertical axis.

Advantageously, the hooking element is coupled to a hooking clamp having several degrees of freedom and provided with an adjustment system allowing adjustments according to at least two degrees of freedom in rotation, and for example three degrees of freedom in rotation, and according to at least two degrees of freedom in translation.

The advantage of such a hooking clamp is to facilitate the guiding of the constituent element(s) of the wind turbine during lifting and during assembly, in particular the blades when they have to be centered on the turbine and align them radially.

According to one feature, the receiving floating structure is laid on a bottom of the body of water or is held floating and anchored on the bottom of the body of water during the use of the lifting device to lift and mount at least one of the constituent elements of the wind turbine onto said floating structure receiving.

The receiving floating structure can thus be ballasted and placed on the bottom of the body of water (for example the port or the bay), taking into account the tidal variations and the oceanographic and meteorological conditions, allowing this receiving floating structure to remain in place during the installation of its wind turbine, and also in the event of a storm before and after the mounting of the wind turbine. Alternatively, the receiving floating structure can remain floating, while being anchored to the bottom of the body of water.

According to another feature, the floating mounting structure is laid on a bottom of the body of water or is held floating and coupled to the receiving floating structure during the use of the lifting device to lift and mount at least one of the constituent elements of the wind turbine onto said receiving floating structure.

Advantageously, the at least N floating structures are all manufactured on the basis of a same structure of the semi-submersible type.

In a particular embodiment, the floating offshore wind farm comprises N floating offshore wind power plants and N floating structures are provided on the body of water, whereby the floating mounting structure is employed to mount on (N−1) receiving floating structures all or part of the constituent elements of the wind turbine to finally obtain (N−1) floating offshore wind power plants and, once the lifting and assembly operations by means of the lifting device have been completed, said lifting device is removed from the floating mounting structure in order to allow mounting a wind turbine and thus obtain the $N^{th}$ floating offshore wind power plant.

In other words, the floating mounting structure will be used to form the $N^{th}$ and last floating offshore wind power plant, by mounting its own wind turbine on it, this time by means of a lifting crane, such as a quayside crane. Of course, if two floating mounting structures are employed, then one and/or the other of the two floating mounting structures can be used to form one or two floating offshore wind power plants.

In the context of the first embodiment, the lifting device is removed from the top of the mast provided on the floating mounting structure in order to allow a turbine and blades to be mounted on said top to form a wind turbine and thus obtain the $N^{th}$ floating offshore wind power plant.

Alternatively, the floating offshore wind farm comprises N floating offshore wind power plants and are provided (N+1) floating structures on the body of water, so that the floating mounting structure is employed to mount on N receiving floating structures all or part of the constituent elements of the wind turbine to finally obtain the N floating offshore wind power plants and, once the lifting and assembly operations by means of the lifting device have been completed, said floating mounting structure is stored in a predefined place.

Also, this floating mounting structure could for example be reused for the development of a new similar floating offshore wind farm or whose wind turbines are of the same or lower height. If necessary, the lower spacing device(s) may be adapted to take into account other types of floating structure.

This floating mounting structure can also be used to carry out maintenance at sea on the floating offshore wind farm resulting from the method according to the invention, in particular in the event of damage to the wind turbine blades or to parts of the turbine.

BRIEF DESCRIPTION OF FIGURES

Other features and advantages of the present invention will appear on reading the detailed description below, of non-limiting examples of implementation, made with reference to the appended figures in which.

DETAILED DESCRIPTION OF EMBODIMENTS OF THE INVENTION

Figure 7:
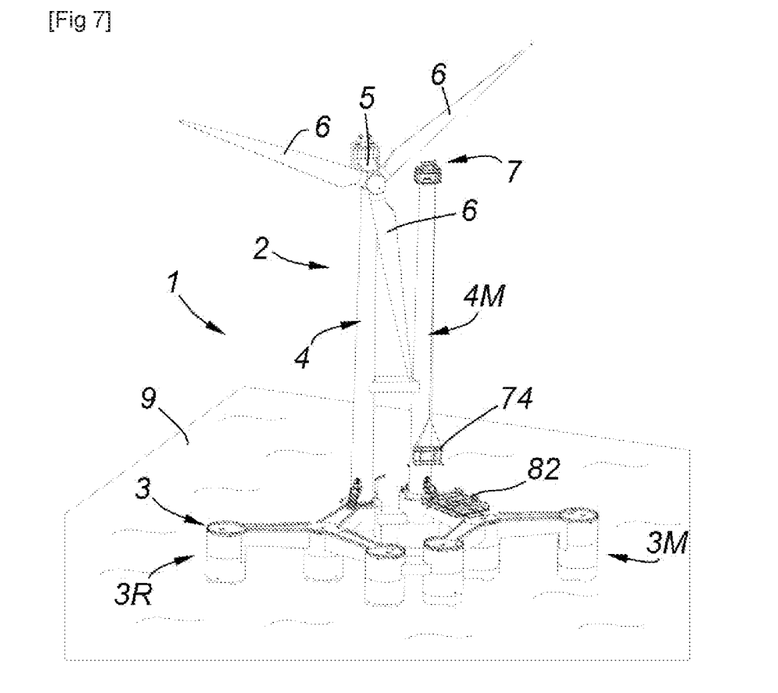
FIG. 7 is a schematic perspective view at the end of the phase of mounting the blades on the turbine of the receiving floating structure, following FIG. 6.
Figure 10:
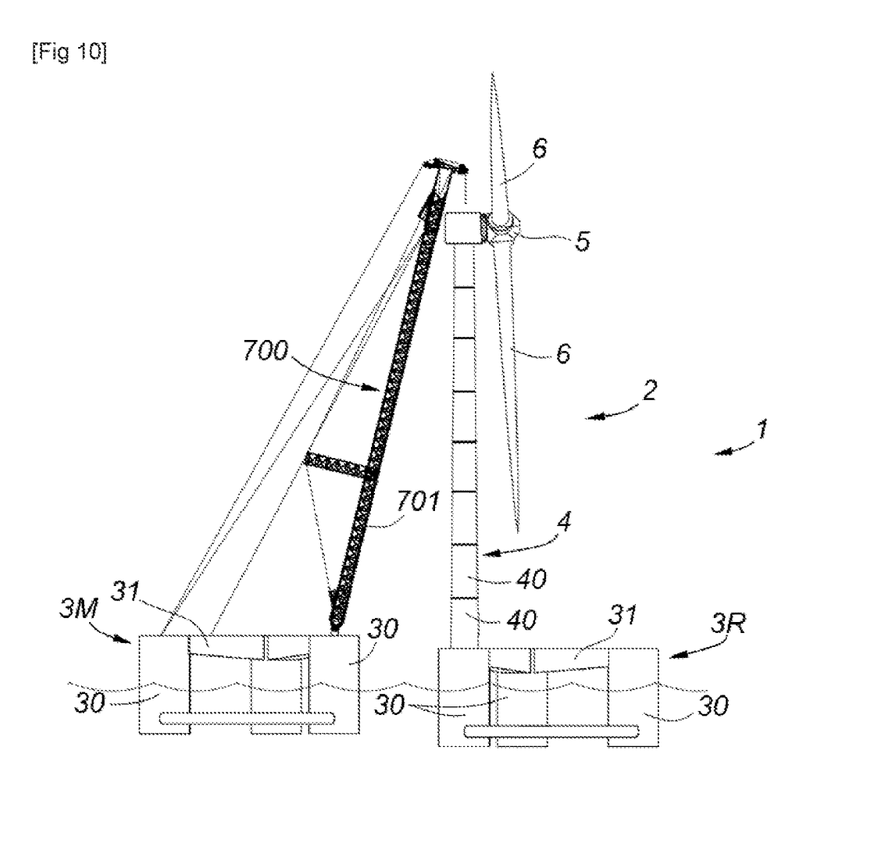
FIG. 10 is a schematic side view at the end of a phase of mounting the blades on the turbine of the receiving floating structure, by means of the lifting device of the floating mounting structure, following FIG. 9.

With reference to the Figures, the following description relates to a method for assembling a floating offshore wind farm, for an assembly in a body of water 9 of at least N floating offshore wind power plants 1, N being an integer greater than or equal to 3; in which each floating offshore wind power plant 1 comprises a wind turbine 2 mounted on a floating structure 3; FIG. 7 illustrating a floating offshore wind power plant 1 resulting from a first embodiment of such a method and FIG. 10 illustrating a floating offshore wind power plant 1 resulting from a second embodiment of such a method.

At the end of the method, each floating offshore wind power plant 1 therefore comprises the wind turbine 2 mounted on the floating structure 3, where the wind turbine 2 comprises an assembly of several constituent elements 4, 40, 5, 6 including at least one mast 4 fixed on the floating structure 3 and composed of a stack of several mast sections 40, a turbine 5 fixed on a top of the mast 4, and blades 6 coupled to the turbine 5.

This method comprises a step of providing and arranging at least N floating structures 3 on the body of water 9. These floating structures 3 are all manufactured on the basis of a same structure of the semi-submersible type.

In the illustrated and not limiting example, the structure of the semi-submersible type comprises at least three columns 30, each column 30 comprising a non-submerged part and a submerged part, and connecting elements 31 for rigidly connecting the columns 30 to each other. In the illustrated example, the structure of the semi-submersible type comprises four columns 30, including a central column and three peripheral columns distributed around the central column and connected to the latter by the connecting elements 31. Of course, other semi-submersible structures are possible within the scope of the invention.

The method further comprises the steps of providing a plurality of mast sections 40 to assemble at least N masts 4 and to provide turbines 5 and blades 6 for at least N wind turbines 2. These constituent elements 4, 40, 5, 6 are stored in a storage space, for example on land, near a quay, or at sea, on a suitable storage barge.

The method then comprises a step of selecting, among the at least N floating structures 3, at least one floating structure called floating mounting structure 3M, the other floating structures being called receiving floating structures 3R. The Figures all show the floating mounting structure 3M next to one of the receiving floating structures 3R.

Figure 8:
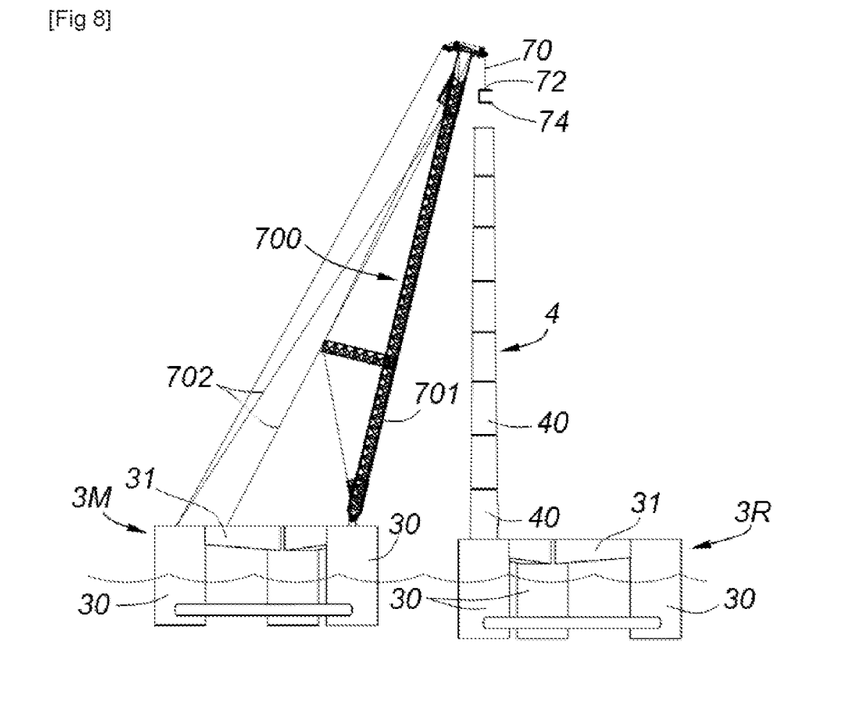
FIG. 8 is a schematic side view of an implementation of an assembly method according to a second embodiment of the invention, at the end of a phase of mounting a mast on a receiving floating structure, by means of a lifting device placed on a floating mounting structure.
Figure 9:
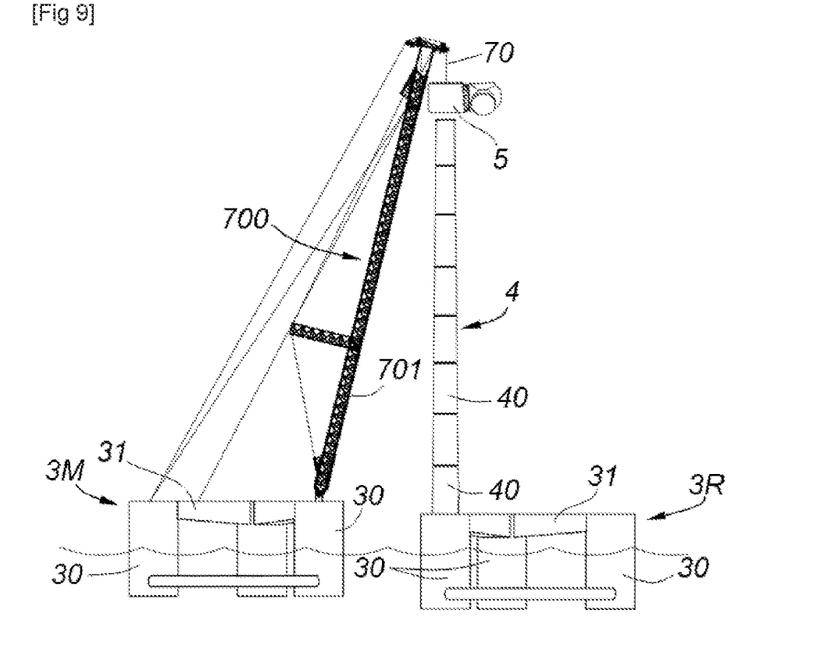
FIG. 9 is a schematic side view during a phase of mounting a turbine at the top of the mast previously mounted on the receiving floating structure, by means of the lifting device of the floating mounting structure, following FIG. 8.

The method is followed by fastening a lifting device 7 or 700 on the floating mounting structure 3M. Two embodiments can be considered, namely the first embodiment illustrated in FIGS. 1 to 7 and associated with the lifting device 7, and the second embodiment illustrated in FIGS. 8 to 10 and associated with the lifting device 700.

In the first embodiment, a step is at first provided for fastening a mast 4M to the floating mounting structure 3M, by stacking several mast sections 40 among the plurality of mast sections 40 stored on land or at sea.

It is all the same conceivable that the mast 4M on the floating mounting structure 3M be structurally modified, and in particular reinforced, with respect to the masts 4R provided on the receiving floating structures 3R. However, the mast 4M has the same height as the masts 4R.

This step of fastening the mast 4M is followed by a step of fastening the lifting device 7 to the top of the mast 4M provided on the floating mounting structure 3M. At the top of the mast 4M, there can be provided a specific upper flange serving to fix a rotation flange of the turbine 5, and in this case, it is possible that this lifting device 7 is adapted to also be fixed on such a top flange. This lifting device 7 may itself have an orientation ring or else a fixed orientation.

To mount the mast 4M on the floating mounting structure 3M and then to mount the lifting device 7 to the top of the mast 4M, it is possible to use a crane present on a quay. The lifting device 7 after installation can be tested according to the regulations in force.

In the second embodiment, provision is made to fix a lifting device 700 to one or more columns 30 of the floating mounting structure 3M, wherein this lifting device 700 comprises a lifting structure 701 having sufficient height to lift and mount all the constituent elements 4, 40; 5; 6 of the wind turbine 2 onto the receiving floating structure 3R, in other words a height greater than the height of the wind turbine 2. This lifting device 700 can for example be in the form of a so-called articulated jib crane, wherein the lifting structure 701 is present in the form of a jib articulated on one or more columns 30.

This lifting structure 701 can comprise:
  a pylon articulated on one of the columns 30 (this pylon then forming the articulated jib); or
  two pylons connected by one or more crosspieces and articulated on two respective columns 30 (these two pylons and this (these) crosspiece(s) then forming the articulated jib).

This lifting structure 701 can be guyed on another column 30, by means of guys 702.

The lifting device 7, 700 can comprise a lifting system driving up/down a lifting cable 70 carried by a jib 71 or by the lifting structure 701 and coupled to a hooking element 72, where this lifting system comprises for example a lifting winch connected to a hydraulic unit, and the supply of this hydraulic unit can be done from a generator located at the level of the floating mounting structure 3M, on a column 30 and for example at the foot of the mast 4M. The lifting system can operate in single strand for lifting lighter loads, such as blades, and can operate in multiple strands, via a reeving system, for heavier loads, such as a turbine 5. The jib 71 or the lifting structure 701 can be orientable, in other words it can pivot around a vertical axis, and for example around the axis of the mast 4M (which is vertical in position) and it can optionally also be raised/lowered (in other words it can pivot at its foot around a horizontal axis, so that the tip of the jib 71 or of the lifting structure 701 can be adjusted in height and therefore the load can be lifted more or less high). It is also conceivable that the jib 71 or the lifting structure 701 is of fixed inclination, in other words that it cannot be raised/lowered.

The control/command of the lifting device 7, 700 to control the operations of lifting, orientation and possibly raising/lowering of the jib 71 or of the lifting structure 701, can be done locally near this last, or by remote control (wireless or wired) from a remote location.

The method then comprises the steps of fastening one or more lower spacing devices 80 and also a storage arrangement 82 on the floating mounting structure 3M. Such lower spacing devices 80 are not illustrated in FIGS. 8 to 10 but may of course be present.

The lower spacing device(s) 80 are provided on the sides of the floating mounting structure 3M, preferably at its non-immersed part, and their function is to maintain a minimum spacing with the receiving floating structure 3R, or even also to maintain the two floating structures 3M, 3R together during the following steps in order to have a fixed distance between the two floating structures 3M, 3R. In FIGS. 1 to 7, two lower spacing devices 80 are provided on columns 30 of the floating mounting structure 3M. As visible in FIGS. 3 to 7 in the first embodiment, it is also possible to provide an upper spacing device 81 on the mast 4M mounted on the floating mounting structure 3M. The lower and upper 80, 81 spacing devices can be provided with respective shock absorbers which will make it possible to limit the relative movements between the two floating structures 3M, 3R.

The storage arrangement 82 is provided on top of the non-submerged part of the floating mounting structure 3M, and its function is to support for storing constituent elements of a wind turbine 2 such as mast sections 40, turbine 5 and blades 6, not necessarily all at the same time depending on the available size. Of course, once the constituent elements are in place on the storage arrangement 82, the latter are moored for example by means of links. This storage of constituent elements of a wind turbine 2 on the storage arrangement 82 will allow minimizing round trips to the storage space, which is as a reminder on land or at sea.

Once the floating mounting structure 3M is equipped with its lifting device 7, 700, possibly with its mast 4M for the first embodiment, with its lower and upper spacing devices 80, 81 and with its storage arrangement 82, the method is followed with successive mounting phases of the wind turbines 2 on the receiving floating structures 3R, and the remainder of the description relates to a mounting phase of a wind turbine 2 on a receiving floating structure 3R.

The mounting phase begins with a step of loading onto the floating mounting structure 3M, and in particular onto its storage arrangement 82, one or more constituent elements of a wind turbine 2.

For this loading, it is possible to bring the floating mounting structure 3M to the edge of the storage space, for example to an edge of a quay or a storage barge, in order to load the constituent element(s) of the wind turbine 2 onto the storage arrangement, in other words transfer the constituent element(s) of the wind turbine 2 from the storage space to the floating mounting structure 3M. This loading can be done by means of the lifting device 7 or a crane provided at the level of the storage space, therefore a crane on the quay or a crane on the barge.

Alternatively, it is possible to dock the floating mounting structure 3M by a boat or a barge transporting the constituent element(s) of the wind turbine 2 in order to load it onto the storage arrangement 82. In this case, this boat or barge shuttles between the storage space and the floating mounting structure 3M. The loading from the boat or barge to the floating mounting structure 3M can be done using the lifting device 7, 700 or a crane provided on the boat or barge.

Figure 1:
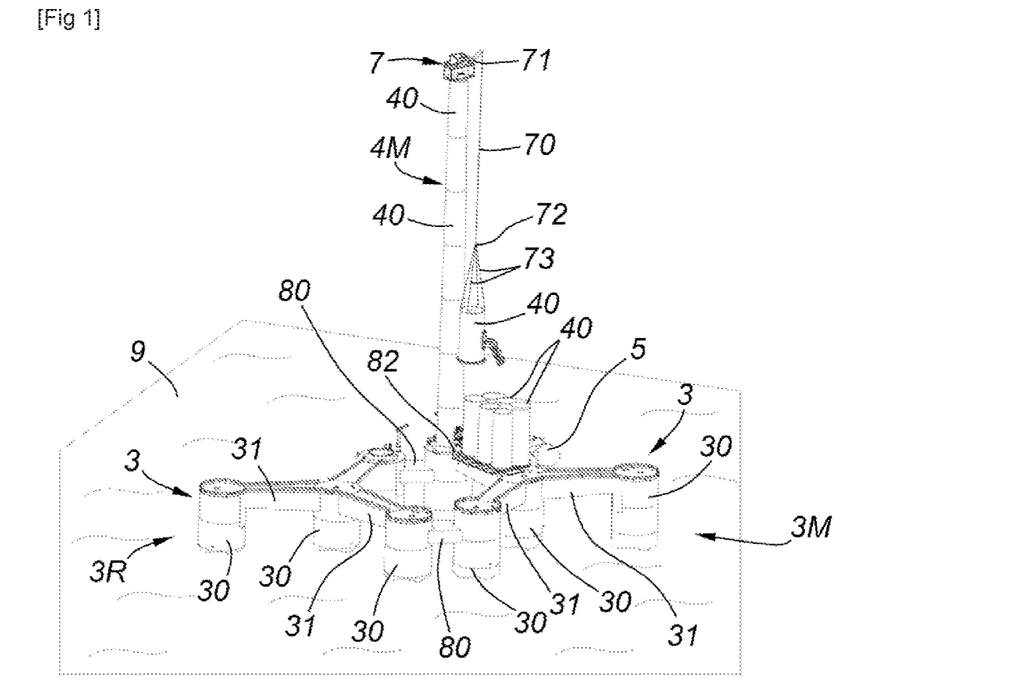
FIG. 1 is a schematic perspective view of an implementation of an assembly method according to a first embodiment of the invention at the start of a mounting phase of a mast on a receiving floating structure, by means of a lifting machine placed at the top of a mast provided on a floating mounting structure.
Figure 2:
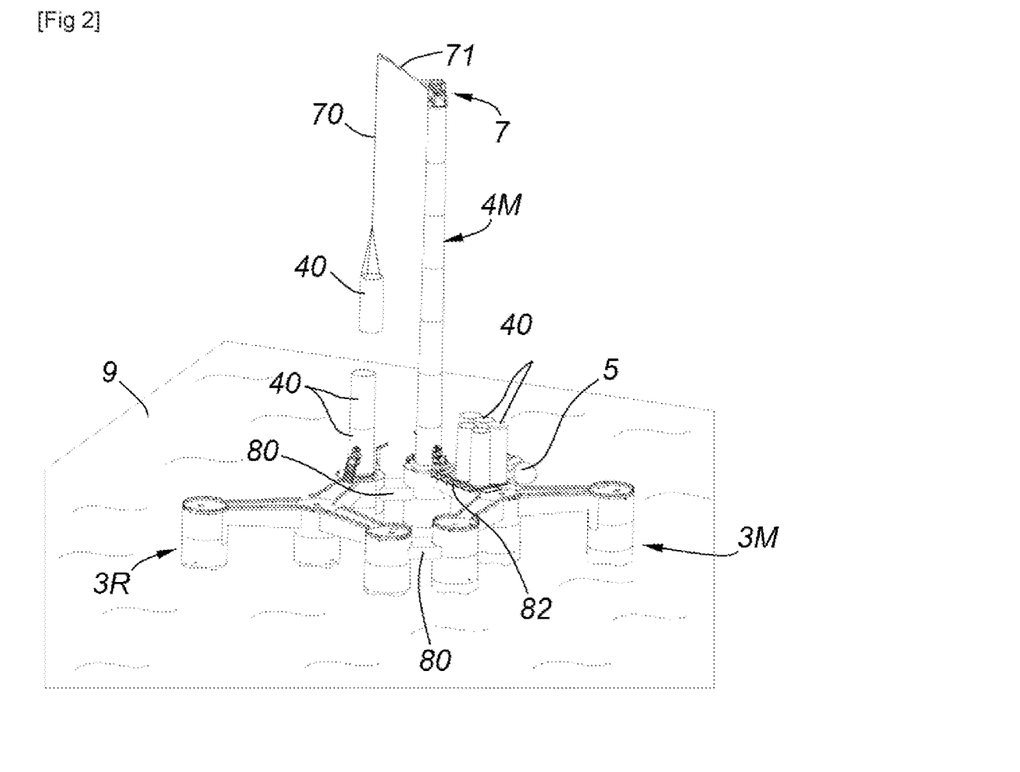
FIG. 2 is a schematic perspective view during the phase of mounting the mast on the receiving floating structure, following FIG. 1.
Figure 3:
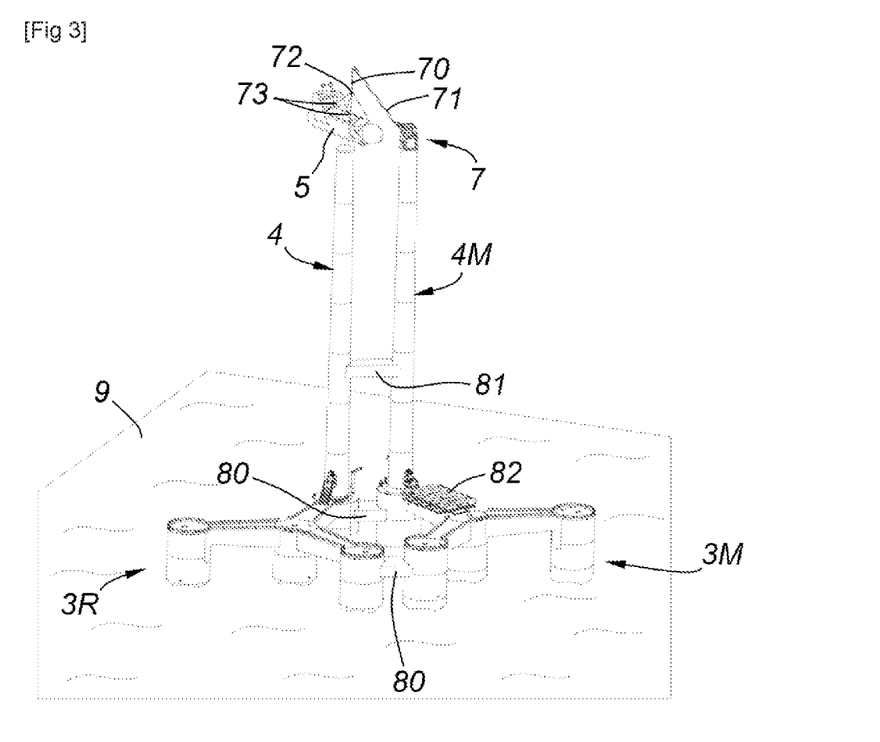
FIG. 3 is a schematic perspective view during a mounting phase of a turbine at the top of the mast previously mounted on the receiving floating structure, by means of the lifting device of the floating mounting structure, following FIG. 2.
Figure 4:
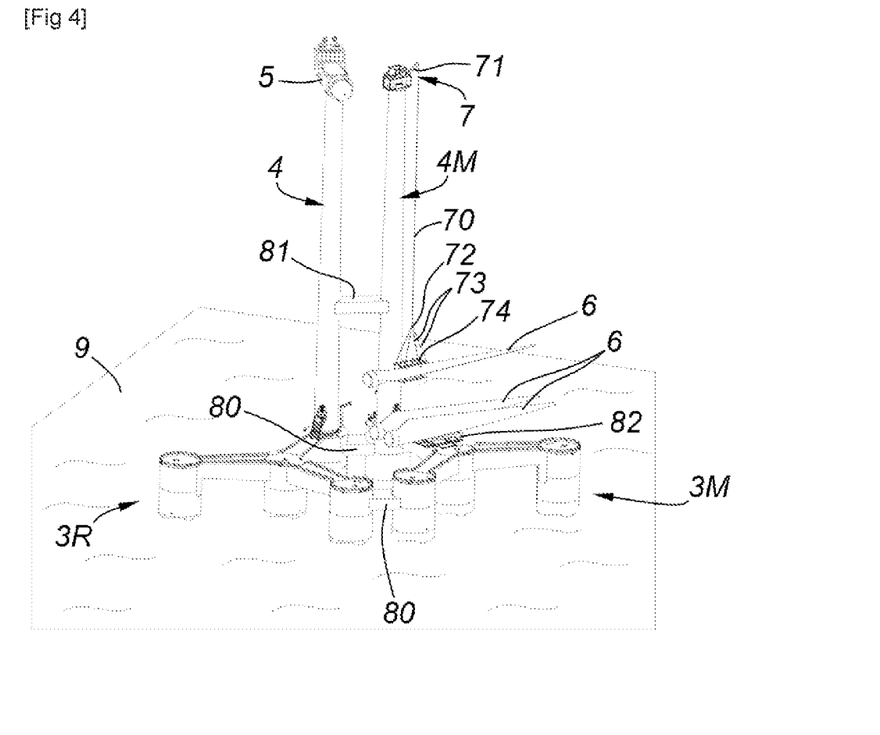
FIG. 4 is a schematic view in perspective at the beginning of a phase of mounting the blades on the turbine of the receiving floating structure, by means of the lifting device of the floating mounting structure, following FIG. 3.
Figure 5:
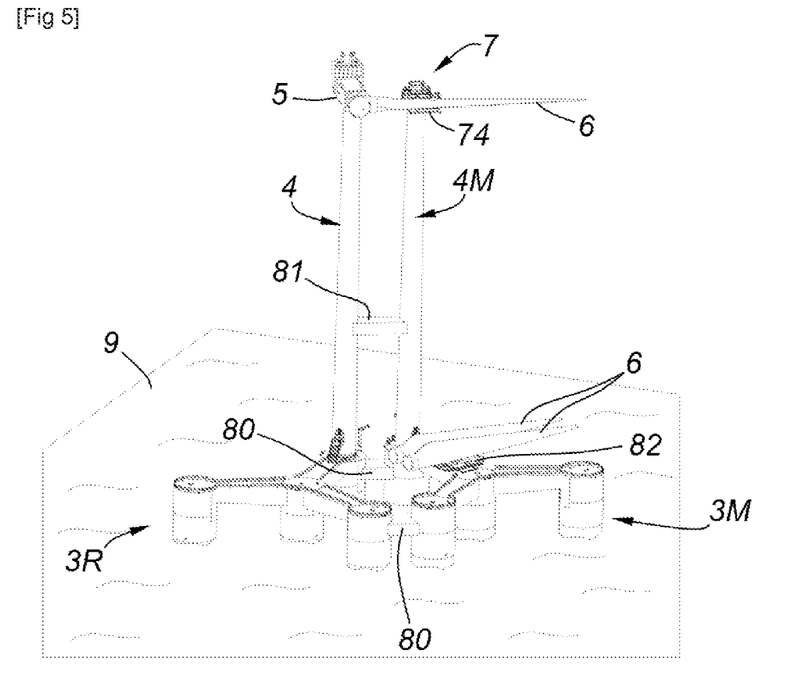
FIG. 5 is a schematic perspective view during the phase of mounting the blades on the turbine of the receiving floating structure, following FIG. 4.
Figure 6:
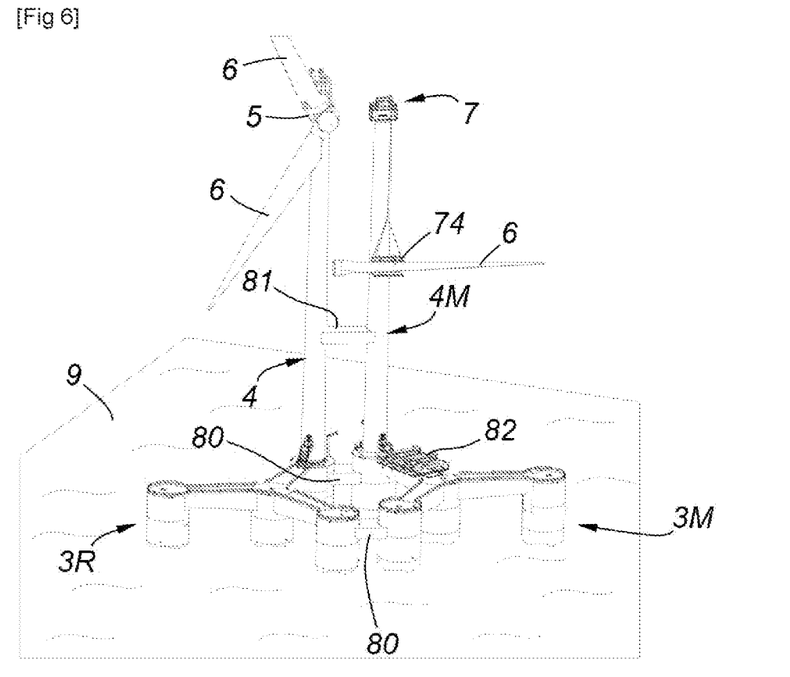
FIG. 6 is a schematic perspective view during the phase of mounting the blades on the turbine of the receiving floating structure, following FIG. 5.

In the example of FIG. 1, the floating mounting structure 3M is loaded with mast sections 40 suitable for mounting a mast 4 on the receiving floating structure 3R, and also with a turbine 5. In the example of FIG. 4, the floating mounting structure 3M is loaded with blades 6, which serve once the mast 4 and the turbine 5 are mounted on the receiving floating structure 3R.

The mounting phase is followed by a step of moving the floating mounting structure 3M up to the receiving floating structure 3R, and using the lifting device 7, 700 to lift and mount at least one constituent elements 4, 40, 5, 6 of the wind turbine 2 onto this receiving floating structure.

During this closeness moving step, it is conceivable that it is the floating mounting structure 3M which is conveyed up to the receiving floating structure 3R, or conversely that it is the receiving floating structure 3R which is conveyed up to the floating mounting structure 3M.

For example, the receiving floating structure 3R is ballasted and placed on the bottom of the body of water 9 (for example on the bottom of a port or a bay) throughout the mounting phase, by taking into account tidal variations and oceanographic and meteorological conditions ensuring that the receiving floating structure 3R remains in place under the installation conditions, or even in the event of a storm before and after wind turbine 2 has been mounted.

Alternatively, the receiving floating structure 3R is held floating and is anchored to the bottom of the body of water 9 (for example to the bottom of a port or a bay) throughout the mounting phase.

The floating mounting structure 3M, previously loaded, is then towed to the receiving floating structure 3R and is coupled to the receiving floating structure 3R by means of the lower spacing device(s) 80, and if necessary, also the upper spacing device 81. Thus, once the floating mounting structure 3M has moved up to the receiving floating structure 3R, the lower spacing device(s) 80 are interposed between the receiving floating structure 3R and the floating mounting structure 3M to maintain a minimum spacing. In this way, the floating mounting structure 3M is held floating, and it is coupled to the receiving floating structure 3R during the mounting phase by means of the lower and upper spacing device(s) 80, 81.

More specifically, the lower spacing device(s) 80 are fixed to the receiving floating structure 3R following the closeness movement of the floating mounting structure 3M, thus securing the two floating structures 3M, 3R. In the illustrated example, the two lower spacing devices 81 are fixed to the columns 30 of the receiving floating structure 3R and are thus interposed between the columns 30 of the floating mounting structure 3M and the columns 30 of the receiving floating structure 3R. Thus, after docking and securing the floating mounting structure 3M on the receiving floating structure 3R by means of the lower spacing device(s) 80, the behavior of the floating mounting structure 3M and possibly of the load in the lower spacing devices 80 are controlled.

As visible in FIGS. 3 to 7 for the first embodiment, it is also possible to fix the upper spacing device 81 on the mast 4 mounted on the receiving floating structure 3R (when this mast 4 is present), so that this upper spacing device 81 secures between them the mast 4M, provided on the floating mounting structure 3M, and the mast 4, provided on the receiving floating structure 3R, This upper spacing device 81 can be located in the first third of the mast 4M and it is thus put in place in order to have a three-point link between the two floating structures 3M, 3R, thus making it possible to reduce the variations in distance between the axis of the mast 4 and the axis of the mast 4M.

Also, the lower and upper spacing device(s) 80, 81 are provided with fastening means, such as for example fastening means by tightening, bolting, clamping, screwing, suction cup, etc. Advantageously, the lower and upper spacing device(s) 80, 81 are provided with indexing or centering means, such as for example a free end of concave shape complementary to the shape of the columns 30 and the mast 4 respectively.

The loads in the lower and upper spacing devices 80, 81 can be controlled and absorbed in real time to avoid overloads due to the floating mounting structure 3M which remains subject to the action of wind and swell. The floating mounting structure 3M thus has a ballasting system which is designed to both compensate for the tidal range, to maintain a substantially fixed draft (for example in the range of 2 meters under the floating mounting structure 3M) and adjust a height of the lifting device 7 when it is used to lift and mount the constituent element(s) of the wind turbine 2 onto the receiving floating structure 3R.

Once the floating mounting structure 3M is coupled to the receiving floating structure 3R, the mounting phase comprises the step of using the lifting device 7, 700 to lift and mount the constituent elements of the wind turbine 2 which are stored on the storage arrangement 82 onto the receiving floating structure 3R.

In FIGS. 1 to 3, 8 and 9, the lifting device 7 is used to lift and mount the mast 4 of the wind turbine 2 onto the receiving floating structure 3R, gradually lifting and mounting the corresponding mast sections 40 by means of the lifting device 7, then to lift and mount the turbine 5 onto the receiving floating structure 3R, at the top of the mast 4 previously mounted onto the receiving floating structure 3R.

It should be noted that, when the mast 4 has been mounted onto the receiving floating structure 3R, the upper spacing device 81 can be fixed between the mast 4M and the mast 4, thus stabilizing the two masts 4, 4M to facilitate the centering and installation.

To lift and mount the mast sections 40, it is possible to hang the mast sections 40 on the hooking element 72 via slings 73. Similarly, to lift and mount the turbine 5, it is possible to hang the turbine 5 on the hooking element 72 via slings 73.

In FIGS. 4 to 7 and 10, the lifting device 7, 700 is used to lift and mount the blades 6 of the wind turbine 2 up to the turbine 5 onto the receiving floating structure 3R, after having previously mounted the mast 4 and the turbine 5 on this receiving floating structure 3R. It should be noted that the mast 4 and the turbine 5 may have been mounted onto the receiving floating structure 3R according to the steps described above with reference to FIGS. 1 to 3, or else may have been mounted on the receiving floating structure 3R at the means of a crane, such as for example the same crane present on a quay which was used to mount the mast 4M and the lifting device 7, 700 on the floating mounting structure 3M.

To lift and mount these blades 6, it is possible to hook a hooking clamp 74 to the hooking element 72, for example via slings 73, and to grasp and lift each blade 6 by means of this hooking clamp 74. Such a hooking clamp 74 is advantageously a hooking clamp with several degrees of freedom, which is provided with an adjustment system allowing adjustments according to at least two degrees of freedom in rotation, and for example three degrees of freedom in rotation, and according to at least two degrees of freedom in translation, which is advantageous for correctly positioning and orienting the blades 6 on the turbine 5.

Thus, the blade 6 and the hooking clamp 74 are lifted by the lifting device 7, 700 up to the proximity of the turbine 5 located at the top of the mast 4. In the first embodiment, it is possible to provide guidance for the hooking clamp 74 with its blade 6 along the mast 4M during lifting, by means of a rail guide (not illustrated) fixed on this mast 4M, thus making it possible to make the lifting of the blades 6 more reliable and thus to increase the meteorological criteria of wind resistance if necessary or the control at sea to minimize the impact of the swell.

When the pale 6 is close to the turbine 5, the displacement of the pale 6 will be made by the lifting device 7, 700, the associated lifting winch can advantageously be equipped with an optional heave compensation function to reduce the heaving motion of the floating mounting structure 3M if necessary. The blade 6 can then be inserted on the turbine 5 horizontally or inclined depending on the hooking clamp 74. The blade 6 is therefore coupled to the turbine 5 and nuts are put in place to secure the blade 6. The blade 6 is held by the lifting device 7, 700 and the hooking clamp 74, until it is secured, with or without heave compensation, then the hooking clamp 74 is opened and disconnected from the blade 6 to be free to pick up another blade 6 stored on the storage arrangement 82.

At the end of the mounting phase, once the wind turbine 2 is assembled on the receiving floating structure 3R, the lower and upper spacing device(s) 80, 81 are detached from the receiving floating structure 3R and the mast 4, so that the floating mounting structure 3M is uncoupled from the receiving floating structure 3R.

Thus, the floating mounting structure 3M can be towed up to another receiving floating structure 3R and the mounting phase can be repeated for the other receiving floating structures 3R.

Once all the receiving floating structures 3R are equipped with their respective wind turbines 2, two possibilities are conceivable for the floating mounting structure 3M which has finished fulfilling its function.

According to a first possibility, the floating mounting structure 3M is brought closer to a quay on which a crane is provided (such as for example the same crane present on a quay which was used to mount the mast 4M and/or the lifting device 7, 700 on the floating mounting structure 3M) and, by means of this crane, the lifting device 7, 700 is removed from the floating mounting structure 3M, and in particular in the first embodiment the lifting device 7 is removed from the top of the mast 4M in order to allow to mount on its top, still by means of this crane, a turbine 5 and blades 6. Thus, the floating mounting structure 3M will be used to form a last and $N^{th}$ floating offshore wind power plant 1. At the end of the method, the floating offshore wind farm will therefore comprise N floating offshore wind power plants 1, of which (N−1) coming from receiving floating structures 3R and an $N^{th}$ coming from the floating mounting structure 3M.

According to a second possibility, the floating mounting structure 3M is not used to form a floating offshore wind power plant 1, at least not in the immediate future. Also, so that the floating offshore wind farm can comprise N floating offshore wind power plants 1, are initially provided (N+1) floating structures on the body of water 9, and then N floating offshore wind power plants 1 come from N receiving floating structures 3R, and the last and $(N+1)^{th}$ floating structure will form the floating mounting structure 3M. At the end of the method, this floating mounting structure 3M, possibly with its mast 4M and its lifting device 7, 700 (unless the latter is removed for another use), is stored in a predefined place, and it may for example be:
  subsequently reused for the development of a new floating offshore wind farm, similar or of equivalent or lower height;
  used to carry out maintenance at sea in the event of damage to a blade 6 of a wind turbine 2 on a part of the turbine 5 to be replaced or repaired.

The invention claimed is:
1. A method for assembling a floating offshore wind farm, for an assembly in a body of water of at least N floating offshore wind power plants, N being an integer greater than or equal to 3, wherein each floating offshore wind power plant comprises at least one wind turbine mounted on a floating structure, the wind turbine comprising an assembly of several constituent elements including at least one mast fixed on the floating structure and composed of a stack of several mast sections, a turbine fixed on a top of the mast, and blades coupled to the turbine,
  the method for assembling a floating offshore wind farm comprising the following steps of:
    providing and placing at least N floating structures on the body of water;
    providing a plurality of mast sections for assembling at least N masts;
    providing turbines and blades for at least N wind turbines;
  aid the method for assembling a floating offshore wind farm wherein it comprises the following steps of:
    selecting, among the at least N floating structures, at least one floating structure called floating mounting structure, the other floating structures being called receiving floating structures;
    fastening a lifting device on the floating mounting structure;
    moving the floating mounting structure up to one of the receiving floating structures, and using the lifting device to lift and mount at least one of the constituent elements of the wind turbine onto said receiving floating structure;
    repeating the preceding step for the other receiving floating structures.
2. The method for assembling a floating offshore wind farm according to claim 1, comprising the fastening of a mast on the floating mounting structure, by stacking several mast sections among the plurality of mast sections, and wherein the lifting device is fixed on the top of the mast provided on the floating mounting structure.
3. The method for assembling a floating offshore wind farm according to claim 2, wherein at least one upper spacing device is fixed to the mast provided on the floating mounting structure, and is fixed on a mast erected on the receiving floating structure following the closeness movement of the floating mounting structure and the erection of such a mast on the receiving floating structure.

4. The method for assembling a floating offshore wind farm according to claim 2, wherein the constituent element(s) of the wind turbine, which is or are lifted and mounted on the receiving floating structure by means of the lifting device, is or are guided along the mast provided on the floating mounting structure when lifting, by means of a guide rail fixed to the mast.

5. The method for assembling a floating offshore wind farm according to claim 2, wherein the lifting device is removed from the top of the mast provided on the floating mounting structure in order to allow a turbine and blades to be mounted on the top to form a wind turbine and thus obtain the Nth floating offshore wind power plant.

6. The method for assembling a floating offshore wind farm according to claim 1, wherein the lifting device comprises a lifting structure having sufficient height to lift and mount all of the constituent elements of the wind turbine onto the receiving floating structure.

7. The method for assembling a floating offshore wind farm according to claim 1, wherein, once the floating mounting structure has moved up to the receiving floating structure, at least one lower spacing device is interposed between the receiving floating structure and the floating mounting structure to maintain a minimum spacing.

8. The method for assembling a floating offshore wind farm according to claim 7, wherein the at least one lower spacing device is fixed to the floating mounting structure and is fixed to the receiving floating structure following the movement of the floating mounting structure, thus securing the receiving floating structure and the floating mounting structure.

9. The method for assembling a floating offshore wind farm according to claim 7, wherein the at least one lower spacing device is equipped with at least one damper.

10. The method for assembling a floating offshore wind farm according to claim 1, wherein a ballasting system is provided on the floating mounting structure to adjust a height of the lifting device when it is used to lift and mount at least one of the constituent elements of the wind turbine onto the receiving floating structure.

11. The method for assembling a floating offshore wind farm according to claim 1, wherein the lifting device is used to lift and mount the blades of the wind turbine up to the turbine onto the receiving floating structure, after having previously mounted the mast and the turbine onto the receiving floating structure.

12. The method for assembling a floating offshore wind farm according to claim 1, wherein the lifting device is used to lift and mount the mast of the wind turbine onto the receiving floating structure, gradually lifting and mounting the corresponding mast sections by means of the lifting device.

13. The method for assembling a floating offshore wind farm according to claim 1, wherein the lifting device is used to lift and mount the turbine onto the receiving floating structure, after having previously mounted the mast onto the receiving floating structure.

14. The method for assembling a floating offshore wind farm according to claim 1, wherein at least one of the constituent elements of the wind turbine, provided to be lifted and mounted on the receiving floating structure by means of the lifting device, is previously stored on a storage arrangement provided on the floating mounting structure.

15. The method for assembling a floating offshore wind farm according to claim 14, wherein the floating mounting structure is brought beforehand to an edge of a quay or a storage barge in order to load onto the storage arrangement at least one of the constituent elements of the wind turbine, provided to be lifted and mounted on the receiving floating structure by means of the lifting device.

16. The method for assembling a floating offshore wind farm according to claim 14, wherein the floating mounting structure is docked by a boat or a barge transporting at least one of the constituent elements of the wind turbine, provided to be lifted and mounted onto the receiving floating structure by means of the lifting device, in order to load it onto the storage arrangement.

17. The method for assembling a floating offshore wind farm according to claim 1, wherein the lifting device comprises a lifting system driving up/down a lifting cable carried by a jib or by a lifting structure and coupled to a hooking element, so that the constituent element(s) of the wind turbine, which is or are lifted and mounted on the receiving floating structure by means of the lifting device, is or are hooked to said hooking element before being mounted.

18. The method for assembling a floating offshore wind farm according to claim 17, wherein the jib or the lifting structure is orientable and can optionally be raised/lowered.

19. The method for assembling a floating offshore wind farm according to claim 1, wherein the receiving floating structure is laid on a bottom of the body of water or is held floating and anchored to the bottom of the body of water during the use of the lifting device to lift and mount at least one of the constituent elements of the wind turbine onto the receiving floating structure.

20. The method for assembling a floating offshore wind farm according to claim 17, wherein the hooking element is coupled to a hooking clamp having several degrees of freedom and provided with an adjustment system allowing adjustments according to at least two degrees of freedom in rotation, and for example three degrees of freedom in rotation, and according to at least two degrees of freedom in translation.

21. The method for assembling a floating offshore wind farm according to claim 1, wherein the floating mounting structure is laid on a bottom of the body of water or is held floating and coupled to the receiving floating structure during the use of the lifting device to lift and mount at least one of the constituent elements of the wind turbine onto the receiving floating structure.

22. The method for assembling a floating offshore wind farm according to claim 1, wherein the at least N floating structures are all manufactured on the basis of a same structure of the semi-submersible type.

23. The method for assembling a floating offshore wind farm according to claim 1, wherein the floating offshore wind farm comprises N floating offshore wind power plants and N floating structures are provided on the body of water, so that the floating mounting structure is used to mount all or part of the constituent elements of the wind turbine onto (N−1) receiving floating structures to finally obtain (N−1) floating offshore wind power plants and, once the lifting and mounting operations have been completed using the lifting device, the lifting device is removed from the floating mounting structure in order to allow a wind turbine to be mounted and thus obtain the Nth floating offshore wind power plant.

24. The method for assembling a floating offshore wind farm according to claim 1, wherein the floating offshore wind farm comprises N floating offshore wind power plants and are provided (N+1) floating structures on the body of water, so that the floating mounting structure is used to mount all or part of the constituent elements of the wind turbine onto N receiving floating structures to finally obtain the N floating offshore wind power plants and, once the lifting and mounting operations by means of the lifting device have been completed, the floating mounting structure is stored in a predefined place.

25. The method for assembling a floating offshore wind farm according to claim 24, wherein the floating mounting structure is then reused for the development of a new similar floating offshore wind farm or whose wind turbines are of the same height or lower height, or to carry out maintenance at sea on the floating offshore wind farm.

* * * * *